US012681326B2

(12) United States Patent
Shan et al.

(10) Patent No.: US 12,681,326 B2
(45) Date of Patent: Jul. 14, 2026

(54) SOFT OPTICAL PATCH WITH LIGHT FILTRATION AND VISION CORRECTION FOR OPHTHALMIC APPLICATIONS

(71) Applicant: Essilor International, Charenton-le-pont (FR)

(72) Inventors: Haifeng Shan, Shrewsbury, MA (US); Hao-Wen Chiu, Holden, MA (US); Elliot French, Charlton, MA (US); Aref Jallouli, Shrewsbury, MA (US)

(73) Assignee: Essilor International, Charenton-le-Pont (FR)

( * ) Notice: Subject to any disclaimer, the term of this patent is extended or adjusted under 35 U.S.C. 154(b) by 469 days.

(21) Appl. No.: 18/030,440

(22) PCT Filed: Oct. 6, 2021

(86) PCT No.: PCT/EP2021/077614
§ 371 (c)(1),
(2) Date: Apr. 5, 2023

(87) PCT Pub. No.: WO2022/074075
PCT Pub. Date: Apr. 14, 2022

(65) Prior Publication Data
US 2023/0375856 A1 Nov. 23, 2023

(30) Foreign Application Priority Data
Oct. 9, 2020 (EP) ..................................... 20306180

(51) Int. Cl.
G02C 7/02 (2006.01)
G02C 7/10 (2006.01)

(52) U.S. Cl.
CPC ............. G02C 7/022 (2013.01); G02C 7/104 (2013.01); G02C 7/108 (2013.01);
(Continued)

(58) Field of Classification Search
CPC ........ G02C 7/022; G02C 7/104; G02C 7/108; G02C 2202/12; G02C 2202/16;
(Continued)

(56) References Cited

U.S. PATENT DOCUMENTS 5,705,101 A * 1/1998 Oi ........................... C09B 47/20
540/125
7,036,929 B1 * 5/2006 Harvey .................. G02C 7/086
351/159.02
(Continued)

FOREIGN PATENT DOCUMENTS

CN 103777368 5/2014
CN 109633925 4/2019
(Continued)

OTHER PUBLICATIONS

International Search Report issued in corresponding PCT Application No. PCT/EP2021/077614, mailed Jan. 26, 2022.

*Primary Examiner* — Matthew Y Lee
(74) *Attorney, Agent, or Firm* — Norton Rose Fulbright US LLP

(57) ABSTRACT

An optical article, includes: a first surface and a second surface, wherein at least one microstructure is patterned on the second surface to form a microstructure pattern, the microstructure pattern including a plurality of microlenses configured to adjust a focus of the optical article, and a first dye having a first dye peak absorbance wavelength with a first dye bandwidth, wherein the first dye is configured to filter a first predetermined range of light wavelengths. The optical article may further comprise a protective microstructure pattern, the protective microstructure pattern having a plurality of protective microstructures arranged complementary to an arrangement of a plurality of optical microstructures, the arrangement of the plurality of optical microstruc-
(Continued)

tures being disposed in the complementary arrangement of the protective microstructures.

10 Claims, 7 Drawing Sheets

(52) U.S. Cl.
CPC ..... *G02C 2202/12* (2013.01); *G02C 2202/16* (2013.01); *G02C 2202/20* (2013.01); *G02C 2202/24* (2013.01)

(58) Field of Classification Search
CPC .. G02C 2202/20; G02C 2202/24; G02C 7/10; G02B 3/0037; G02B 3/08; G02B 5/223
See application file for complete search history.

(56) References Cited

U.S. PATENT DOCUMENTS

| | | | | |
|---|---|---|---|---|
| 2012/0057100 A1* | 3/2012 | Masuda | ................. | G02B 5/045 |
| | | | | 359/619 |
| 2013/0141693 A1* | 6/2013 | McCabe | ................. | G02C 7/12 |
| | | | | 351/159.56 |

| | | | | |
|---|---|---|---|---|
| 2014/0232978 A1* | 8/2014 | Park | ......................... | G02C 7/12 |
| | | | | 351/47 |
| 2016/0216537 A1 | 7/2016 | Drobe | | |
| 2016/0306192 A1* | 10/2016 | Marshall | ................. | G02C 7/06 |
| 2017/0269379 A1* | 9/2017 | Arieli | ..................... | G02C 7/021 |
| 2019/0235279 A1* | 8/2019 | Hones | ................... | G02C 7/022 |
| 2020/0073147 A1* | 3/2020 | Bakaraju | ................ | G02C 7/022 |
| 2020/0319480 A1* | 10/2020 | Williams Tinajero | ....................... | |
| | | | | G02C 7/108 |
| 2022/0035179 A1* | 2/2022 | Rappon | ................. | G02C 7/061 |
| 2022/0350169 A1* | 11/2022 | Sankaridurg | .......... | G02C 7/042 |

FOREIGN PATENT DOCUMENTS

| | | | | |
|---|---|---|---|---|
| CN | 109791239 | 5/2019 | | |
| EP | 2138887 | 12/2009 | | |
| WO | WO 2010/135213 | 11/2010 | | |
| WO | WO 2012/067761 | 5/2012 | | |
| WO | WO 2013/070417 | 5/2013 | | |
| WO | WO 2016/168746 | 10/2016 | | |
| WO | WO 2018/076057 | 5/2018 | | |
| WO | WO 2019/206569 | 10/2019 | | |
| WO | WO-2019206569 A1 * | 10/2019 | ............. | G02C 7/06 |
| WO | WO 2020/193473 | 10/2020 | | |

* cited by examiner

SOFT OPTICAL PATCH WITH LIGHT FILTRATION AND VISION CORRECTION FOR OPHTHALMIC APPLICATIONS

CROSS-REFERENCE TO RELATED APPLICATIONS

This application is a national phase application under 35 U.S.C. § 371 of International Application No. PCT/EP2021/077614 filed 6 Oct. 2021, which claims priority to European Patent Application No. 20306180.9 filed 9 Oct. 2020. The entire contents of each of the above-referenced disclosures is specifically incorporated by reference herein without disclaimer.

FIELD OF THE INVENTION

The present disclosure relates to a reversibly attachable optical article for application on eyeglasses and including a microstructure pattern for adjusting optical properties of the optical article.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Current eyeglasses (clear or sunwear) products only provide certain functions. These functions are generally limited within certain scopes. The functions are also fixed once eyeglasses are dispensed. With the constantly changing consumer activity needs, consumers are being more active in daily life and exposed to many digital devices, thus making it important to provide additional on-demand functions to a consumer's eyeglasses when a predetermined situation arises. For example, adding blue light protection when a consumer is using a computer, smart phone, or a tablet, particularly around the evening before sleeping. For instance, one example includes adding color enhancement to regular sunglasses for increased color contrast may be applicable when playing sports. Another example includes adding corrective power to plano sunglasses with the ability to switch between different plano sunglasses. Generally, these additional functions can be categorized into two groups: 1) light filtration, such as Blue cut, Chrono cut, or MR cut, color enhancement, and 2) optical correction, such as corrective power using a microstructure pattern. Thus, a temporary patch including the microstructure pattern to provide both light filtration and optical correction functions is highly desired. However, other functions may also be desired.

Aspects of the invention may address some of the above-described shortcomings in the art, particularly using solutions set forth in the claims.

SUMMARY

The present disclosure relates to an optical article, including: a first surface and a second surface, wherein at least one microstructure is patterned on the second surface to form a microstructure pattern, the microstructure pattern including a plurality of microlenses configured to adjust a focus of the optical article, and a first dye having a first dye peak absorbance wavelength with a first dye bandwidth, wherein the first dye is configured to filter a first predetermined range of light wavelengths.

The optical article may further comprise a protective microstructure pattern, the protective microstructure pattern having a plurality of protective microstructures arranged complementary to an arrangement of a plurality of optical microstructures, the arrangement of the plurality of optical microstructures being disposed in the complementary arrangement of the protective microstructures.

The first surface and the second surface may be included in an optical patch that is removably attached to the optical article along at least a portion of the first surface.

Note that this summary section does not specify every embodiment and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein.

DETAILED DESCRIPTION

Figure 1:
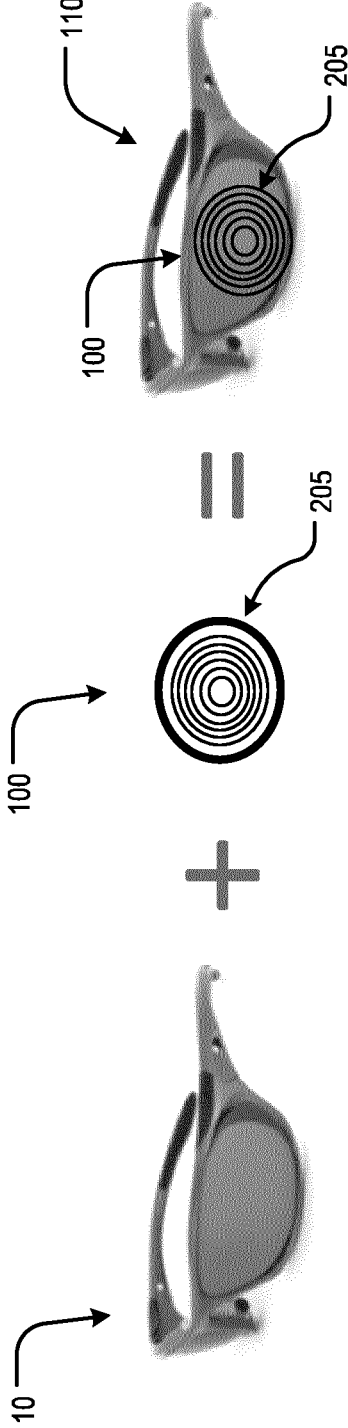
FIG. 1 shows a schematic of applying a removable optical patch to a lens, within the scope of the present disclosure.
Figure 1:

The following disclosure provides many different variations, or examples, for implementing different features of the provided subject matter, which are combinable in any permutation unless described otherwise. Specific examples of components and arrangements are described below to simplify the present disclosure. These are, of course, merely examples and are not intended to be limiting, nor inoperable together in any permutation. Unless indicated otherwise, the features and embodiments described herein are operable together in any permutation. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. Inventive apparatuses may be otherwise oriented (rotated 90 degrees or at other orientations) and the spatially relative descriptors used herein may likewise be interpreted accordingly.

The order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

A removable optical patch having color contrast enhancement and optical power correction for application onto a lens is described herein. The removable optical patch can be fabricated via myriad processes that can form a microstructure pattern on the patch surface either simultaneously or separately for ease of integration into any production process. The microstructure pattern may be formed in rings to generate caustic blur on the retina of the wearer to thereby address myopia progression.

FIG. 1 shows a schematic of applying a removable optical patch 100 to a lens 110, useful within the scope of the present disclosure. The removable optical patch 100 may be an optical article configured to attach to a predetermined surface, such as the lens 110. The lens 110 may be incorporated in, for example, a pair of plano sunglasses, a pair of prescription glasses, or a pair of non-prescription glasses. Upon adhesion to the lens, the removable optical patch 100 may adjust one or more optical properties of the lens 110. Notably, the removable optical patch 100 may include a microstructure pattern 205 having at least one microstructure formed or patterned on a surface of the lens 110.

Figure 2:
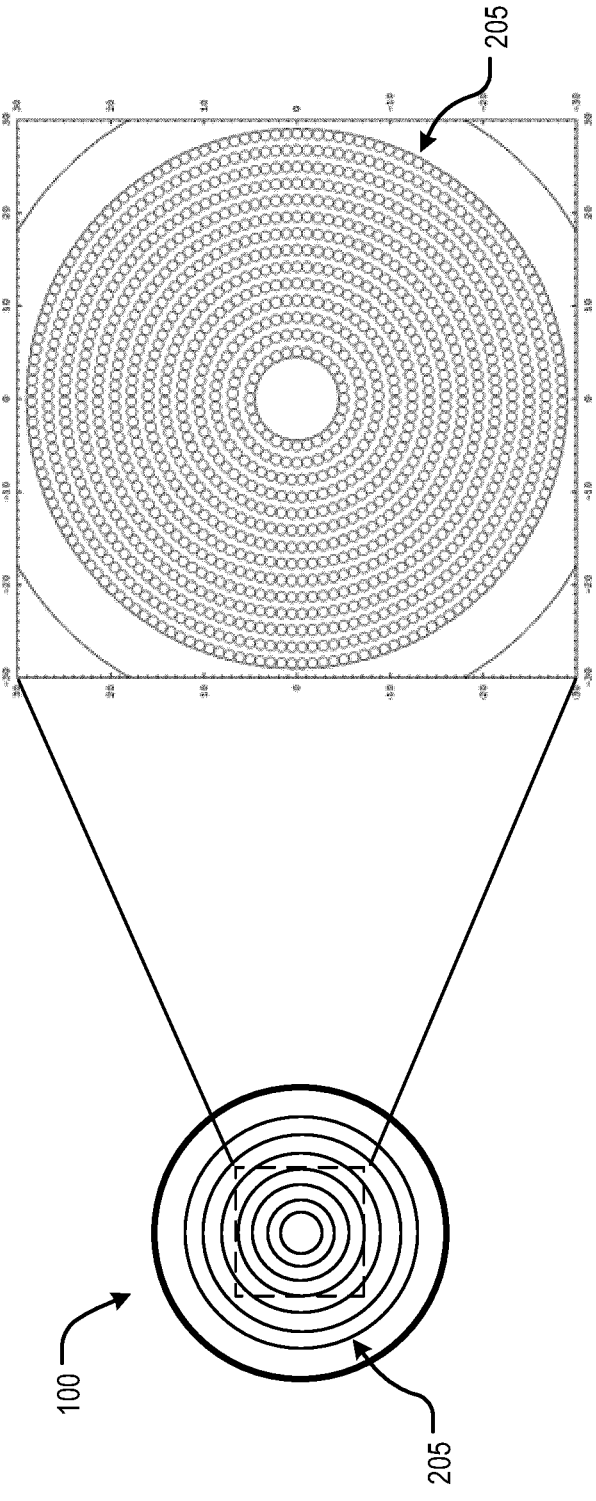
FIG. 2 shows a schematic of a microstructure pattern patterned on a surface of a removable optical patch, within the scope of the present disclosure.

FIG. 2 shows a schematic of the microstructure pattern 205 patterned on the surface of the removable optical patch 100, useful within the scope of the present disclosure. Useful microstructure patterns 205 may include a plurality of microlenses. The plurality of microlenses may be arranged in concentric rings around a center of the removable optical patch 100 and be configured to adjust an optical property of the removable optical patch 100, such as a focus. Useful microstructure patterns 205 may also include a plurality of Fresnel microstructures. The Fresnel microstructures may be configured to adjust, for example, a power of the removable optical patch 100.

Figure 3A:
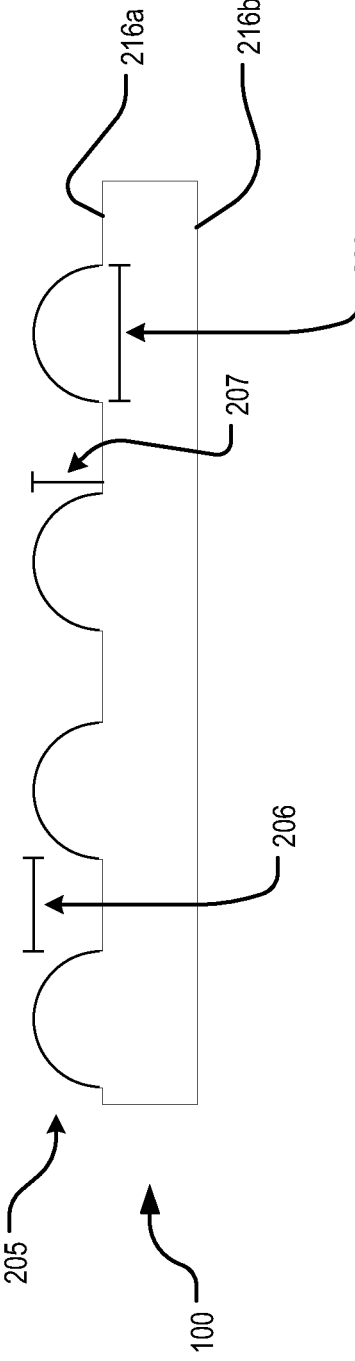
FIG. 3A shows a cross sectional schematic of a microstructure pattern on a surface of a removable optical patch, within the scope of the present disclosure.

FIG. 3A shows a cross sectional schematic of the microstructure pattern 205 on the surface of the removable optical patch 100, useful within the scope of the present disclosure. As shown, the microstructure pattern 205 may be the plurality of microlenses. Each microlens of the microstructure pattern 205 may have a dimensional height 207, a dimensional width 260, and may be separated from an adjacent one microlens of the plurality of microlenses by a predetermined distance 206 that defines an area between the plurality of microlenses of the microstructure pattern 205. Presented as having a hemispherical shape in FIG. 3A, each microlens of the microstructure pattern 205 may have a variety of shapes including hemispherical, aspherical, rectangular, cylindrical, pyramidal, circular, elliptical, triangular, and prismatic, among others, as demanded by a visual requirement. It may be appreciated that the removable optical patch 100, having on the surface thereof the microstructure pattern 205, provides the concentric circle arrangement or other surface pattern appearance. A power variation of the plurality of microlenses may be greater than −3.1D.

A useful shape for each microlens of the microstructure pattern 205 may be aspherical, and a spacing between the arrangement of concentric rings of the plurality of microlenses may be equal. Similarly, the predetermined distance 206 may be equal between each microlens.

The removable optical patch 100 may have a curvature. It may be appreciated that the removable optical patch 100 may include the microstructure pattern 205 on either a first surface 216a or a second surface 216b, wherein the first surface 216a is convex and the second surface 216b is concave. An exemplary useful apparatus having curvature is described as follows.

Figure 3B:
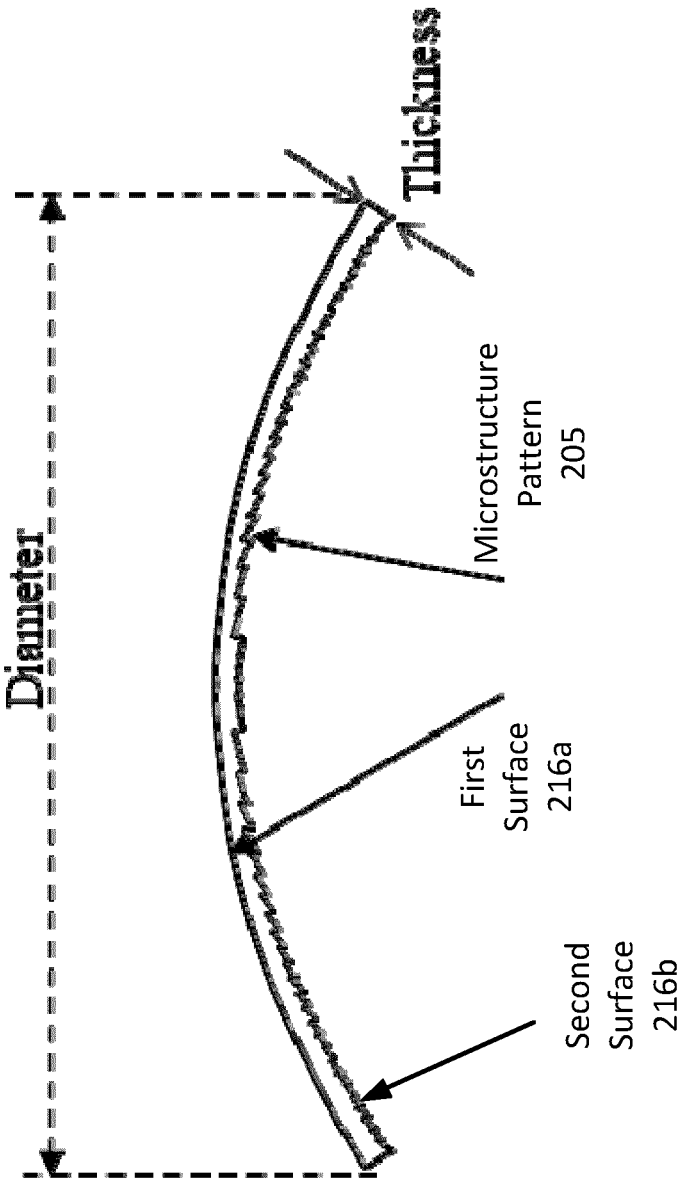
FIG. 3B shows a cross sectional schematic of a removable optical patch having curvature, within the scope of the present disclosure.

FIG. 3B shows a cross sectional schematic of the removable optical patch 100 having curvature, useful within the scope of the present disclosure. The first surface 216a is convex and smooth, which may be optimal for serving as an attachment surface to the lens 110. Smooth may be understood to mean a roughness, RA, of no more than 5.0, 2.0, 0.8, 0.2, or 0.05 μm. The second surface 216b is concave and includes the microstructure pattern 205. As shown, the removable optical patch 100 may include a diameter and a thickness, and the microstructure pattern 205 may be the Fresnel microstructures. Thus, the removable optical patch 100 may be reversibly attached to the lens 110 along an interior (i.e. ocular) surface of the lens 100, that is, the surface closest to the user's eyes. In such a way, the removable optical patch 100 may be hidden behind the lens and be less perceptible. As previously mentioned, the microstructure pattern 205 may conversely be included on the first surface 216a while the second surface 216b is smooth. In such an inventive apparatus, the removable optical patch 100 may be attached to an exterior surface of the lens 110.

A useful shape for the removable optical patch 100 may be spherical and the spacing between the arrangement of concentric rings of the plurality of microlenses may be varied.

Attaching and removing the removable optical patch 100 may be facilitated without an adhesive, such as via electrostatic forces, a transparent liquid (e.g. water) providing surface tension, etc. Useful materials for the removable optical patch 100 may include thermoplastic polyurethane (TPU), polyvinyl chloride (PVC), polyether block amide (PEBA), thermoplastic elastomer (TPE), polydimethylsiloxane (PDMS), polycarbonate (PC), polyamide (PA), poly (methyl methacrylate) (PMMA), cellulose triacetate (TAC), polyethylene terephthalate (PET), polyester, copolyester, and polyolefin. A useful TPU material may include Covestro Texin Sun 3006, the properties of which are listed in Table 1.

TABLE 1

| Properties | Value |
| --- | --- |
| Glass transition temperature (Tg) | −40° C. (−40° F.) |
| Softening temperature (Ts) | 109° C. (228° F.) |

TABLE 1-continued

| Properties | Value |
| --- | --- |
| Degradation temperature (Td) | 275 C. (527 F.) |
| Hardness | 90A scale |
| Light transmission | 92.8% |
| Refractive Index | 1.503 |

Additional useful elements may include dyes incorporated in the removable optical patch 100 for filtering predetermined wavelengths of light. That is, the dyes can provide functions for ultraviolet, blue light or near infrared absorption. The dyes can also provide color enhancement, wherein the dyes filter the predetermined wavelengths of light, for example, in the blue-green crossover region and the yellow region of the visible spectrum of light. This may increase the contrast the user sees and facilitates a view that is more aesthetically pleasing, less eye-strain-inducing, or a combination of both. The dyes can also provide chronobiological functions to help with sleep. For the case of color enhancement, the removable optical patch 100 may include a first dye or a second dye. The first dye can include a first dye peak absorbance wavelength with a first dye bandwidth. The first dye may be configured to filter at a specific wavelength within a range of wavelengths, for example peaking near 500 nm. The second dye may be configured to filter at a specific wavelength within a range of wavelengths, for example peaking near 580 nm. For the case of chrono-biological functions, the removable optical patch 100 may include the first dye or the second dye. The first dye may be configured to filter at a specific wavelength within a range of wavelengths, for example peaking near 490 nm. The second dye may be configured to filter at a specific wavelength within a range of wavelengths, for example peaking near 585 nm. Useful wavelength absorbance ranges for the first dye to provide harmful ultraviolet, violet, or blue light absorption may include 300 to 600, or 320 to 590, or 330 to 500, or 340 to 475, or preferably, 350 to 455 nm. Useful wavelength absorbance ranges for the first dye to provide near infrared absorption may also include 700 to 2500, or 720 to 2250, or 750 to 2100, or preferably, 780 to 2000 nm. A useful first dye peak absorbance wavelength of the first dye to provide color enhancement or chonobiological functions may also include, preferably, 460 to 510 nm with a first dye bandwidth of less than 100 nm, less than 90 nm, less than 80 nm, or less than 70 nm.

A useful inventive apparatus may include one or more dyes in the removable optical patch 100, such as one dye, two dyes, three dyes, more than four dyes, etc. The first dye may be selected from myriad dyes to produce the removable optical patch 100 with a predetermined desired transmission spectrum (or corresponding absorbance spectrum). Useful dyes may include P491, Epolight 5841, Epolight 5819, Epolight 4831, Tinuvin 326, and ABS420, among others. For example, the ABS420 may be included to filter blue light below 420 nm. For example, the Epolight 4831 may be included to filter light in the near infrared (NIR) region of the electromagnetic spectrum. A summary of a selection of useful dyes is described in Table 2.

TABLE 2

| Light filtration function | Dye name | Supplier |
| --- | --- | --- |
| Chrono cut | P491 | Exciton, OH |
| Blue-green & Yellow | Epolight 5841 and Epolight 5819 | Epolin, NJ |

TABLE 2-continued

| Light filtration function | Dye name | Supplier |
| --- | --- | --- |
| NIR cut | Epolight 4831 | Epolin, NJ |
| UV | Tinuvin 326 | BASF |
| Blue cut filter | ABS420 | Exciton, OH |

For the removable optical patch 100 including more than one dye, the first dye may be configured to filter blue-green light while the second dye may be configured to filter yellow light. That is, the second dye may include a second dye peak absorbance wavelength of 550 to 600, or 560 to 590, or 583 to 587, or 595, or 585 nm, and a second dye bandwidth is less than 90 nm, less than 70 nm, less than 50 nm, or less than 25 nm.

To form the removable optical patch 100 and include the first dye, myriad useful systems may be utilized. For example, the first dye may be dry mixed with resin pellets by tumbling/agitation, melt compounded using a screw extruder, or compounded using other compounders.

To form the removable optical patch 100 and include the microstructure pattern 205 on the first surface 216a or the second surface 216b, myriad useful systems may be utilized. For example, the removable optical patch 100 may be injection molded and the mold may include a mold insert with the shape of the microstructure pattern 205. For the microstructure pattern 205 formed on the second surface 216b, a convex mold insert may include the microstructure pattern 205 while a concave mold insert may have a smooth surface. Useful mold inserts may include the convex mold insert with Fresnel microstructures on the surface or the convex mold insert with the plurality of microlenses on the surface. The material for the removable optical patch 100 may be injected in a molten state into the mold having the concave mold insert and the convex mold insert, then cooled to harden and adopt the shape of the mold inserts. A table of properties for an example of the injection molded removable optical patch 100 is shown in Table 3. The patch thus produced has −8.00D optics power with 1 mm center thickness, such as the one shown in FIG. 3B.

TABLE 3

|  | Convex insert | Concave insert |
| --- | --- | --- |
| Surface | Fresnel | Smooth |
| Diameter | 73 mm | 73 mm |
| Radius | 75 mm | 75 mm |
| Optics design | −8.00D | Spheric |
| Material | Steel | Steel |

The injection molding process may be modified further to include high-speed injection-compression molding and a mold temperature with a heating and cooling cycle. This modified process may provide myriad characteristics of the removable optical patch 100 for optical applications, including, but not limited to: 1) thin, 2) soft, 3) tacky, and 4) patterned with a microstructure. These properties, their challenges in view of a traditional injection molding process, and the solution provided by the modified injection molding process, are summarized in Table 4.

TABLE 4

| Part design | Challenges | Solutions |
|---|---|---|
| Thin thickness, 0.5-1 mm | Very high flow resistance | High injection speed and pressure |
| Soft to conform to lens curvature | Poor integrity, hard to be ejected | Cold mold for part ejection |
| Tacky to put on lens w/o glue | Sticky to insert, hard to be ejected | Cold mold for part ejecting |
| Fresnel microstructure | Melt can't flow into sharp corners of microstructures | Injection compression; Heat-cool molding cycle |

The modified injection molding process parameters are summarized in Table 5.

TABLE 5

| Parameter | Value |
|---|---|
| Injection speed | 1.50 inch/s |
| Injection pressure | 25,000 psi |
| Back pressure | 500 psi |
| Barrel temperature | 430° F. |
| Mold temperature | 100° F. |
| Cycle time | 405 s |
| Mokon thermolator heating temp. | 155 F. |
| Mokon thermolator cooling temp. | 104° F. |
| Heat/Cool switching sequence | Switch Mokon from heat to cool when cooling time has 350 seconds left then back to heat with 40 seconds remaining in cycle. |

Figure 3C:
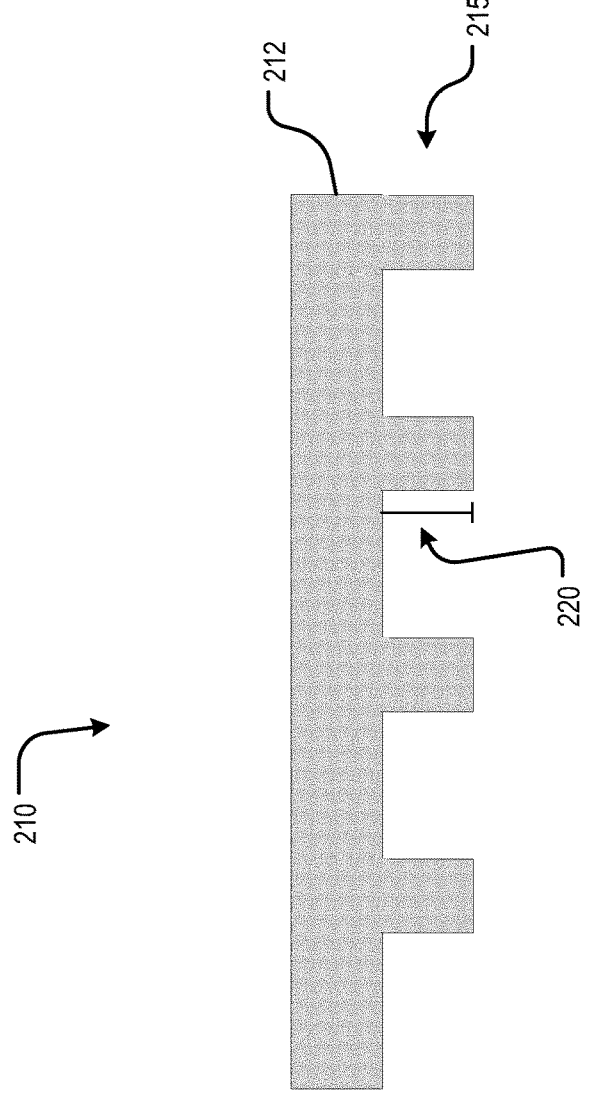
FIG. 3C shows a cross sectional schematic of a protective layer, within the scope of the present disclosure.

FIG. 3C shows a cross sectional schematic of a protective layer 210, useful within the scope of the present disclosure. The protective layer 210 may include a plurality of protective structures 215. The plurality of protective structures 215 may have a dimensional height 220 and may be separated by a distance such that each structure of the plurality of protective structures 215 is aligned with a corresponding area of the microstructure pattern 205 defined by the predetermined distance 206 between adjacent microlenses or Fresnel microstructures of the microstructure pattern 205. Presented as having a rectangular shape in FIG. 3C, the plurality of protective structures 215 may have a variety of cross sectional shapes, including hemispherical, aspherical, rectangular, cylindrical, pyramidal, circular, elliptical, prismatic, and triangular, among others, as dictated by the shape of the area defined by the predetermined distance 206. When coupled together, the plurality of protective structures 215 may arrange complementary to the arrangement of the optical microstructures of the microstructure pattern 205, thereby protecting the optical microstructures while not impeding their function. The protective layer 210 may be included with the removable optical patch 100 to protect the microstructure pattern 205 and increasing durability. Furthermore, the plurality of protective structures 215 may be disposed on a first surface, and a second surface opposite the first surface may be smooth. Upon coupling the protective layer 210, the removable optical patch 100 may then have two smooth sides along an exterior of the removable optical patch 100 to which the removable optical patch 100 may be applied to the lens 110.

Further inventive apparatuses include the first dye (or second dye, third dye, etc. when more than one dye is used) in the protective layer 210, thus allowing a modular configuration for the removable optical patch 100. That is, multiple additional protective layers 210 may be produced including multiple different absorbance and transmission properties (via varying inclusion of the myriad dye and microstructure patterns 205) to allow the user to tailor the stacking of the multiple layers in the removable optical patch 100 to achieve a desired optical effect. The protective layer 210 may include fiduciary markers to aid the user in aligning the desired layers to ensure optimal optical integration between said layers.

EXAMPLES

Figure 4A:
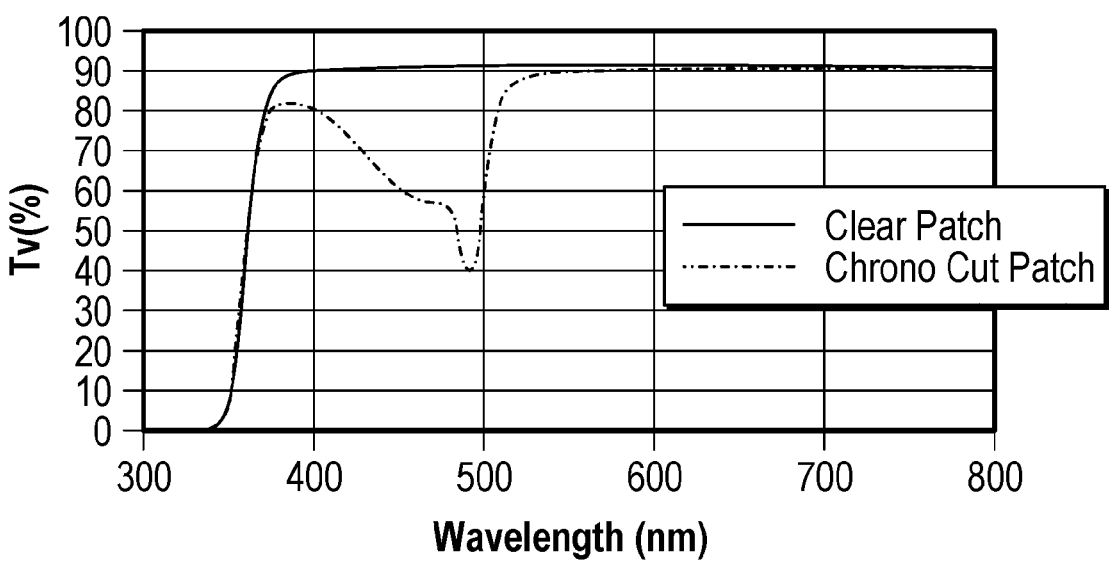
FIG. 4A shows a graph comparing a "Chrono cut" removable optical patch as compared to a clear patch.

EXAMPLE 1—"Chrono cut" dye P491 was mixed with TPU Texin Sun 3006 at 72 ppm and injection molded into the removable optical patch 100 including Fresnel microstructures using the modified injection molding process described above. High replication quality of the Fresnel microstructures was achieved. FIG. 4A shows a graph comparing the "Chrono cut" removable optical patch 100 as compared to a clear patch with a distinct absorbance peak at approximately 495 nm.

EXAMPLE 2—A plurality of dyes (narrowband and broadband) were mixed together with TPU Texin Sun 3006 according to Table 6 to produce the removable optical patch 100 with color enhancement.

TABLE 6

| Material | Amount |
|---|---|
| Tinuvin 326 | 0.5% |
| Epolight 5841 (λmax in PC = 498 nm) | 23 ppm |
| Epolight 5819 (λmax in PC = 585 nm) | 38 ppm |
| Solvent orange 60 | 131 ppm |
| Solvent red 111 | 63 ppm |
| Solvent Violet 36 | 86 ppm |
| Solvent green 3 | 158 ppm |

Figure 4B:
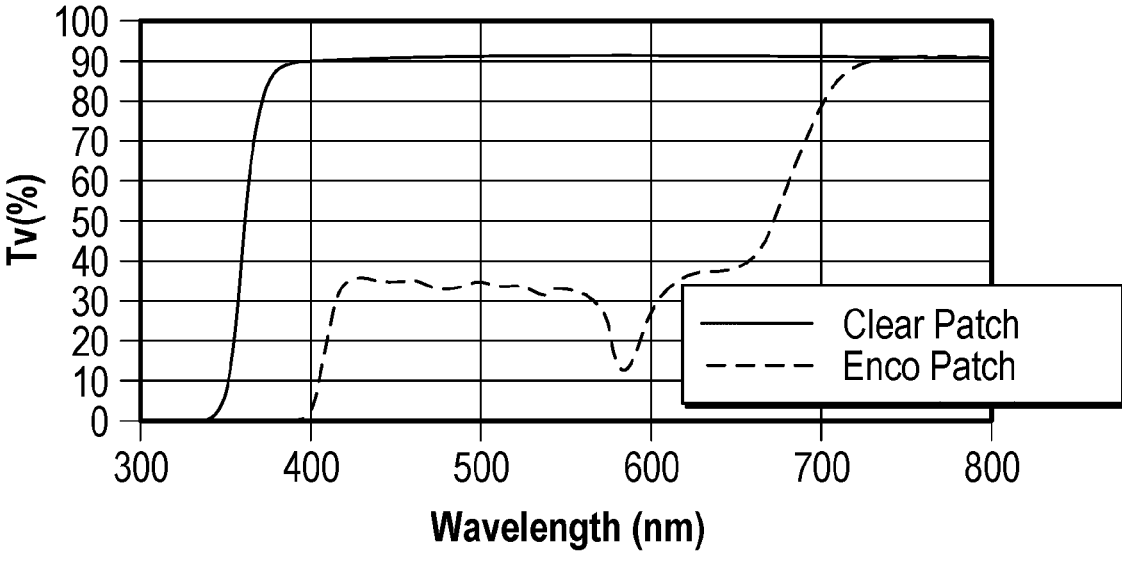
FIG. 4B shows a graph comparing a "color enhancing" removable optical patch as compared to a clear patch.

FIG. 4B shows a graph comparing the "color enhancing" removable optical patch 100 as compared to a clear patch.

Figure 4C:
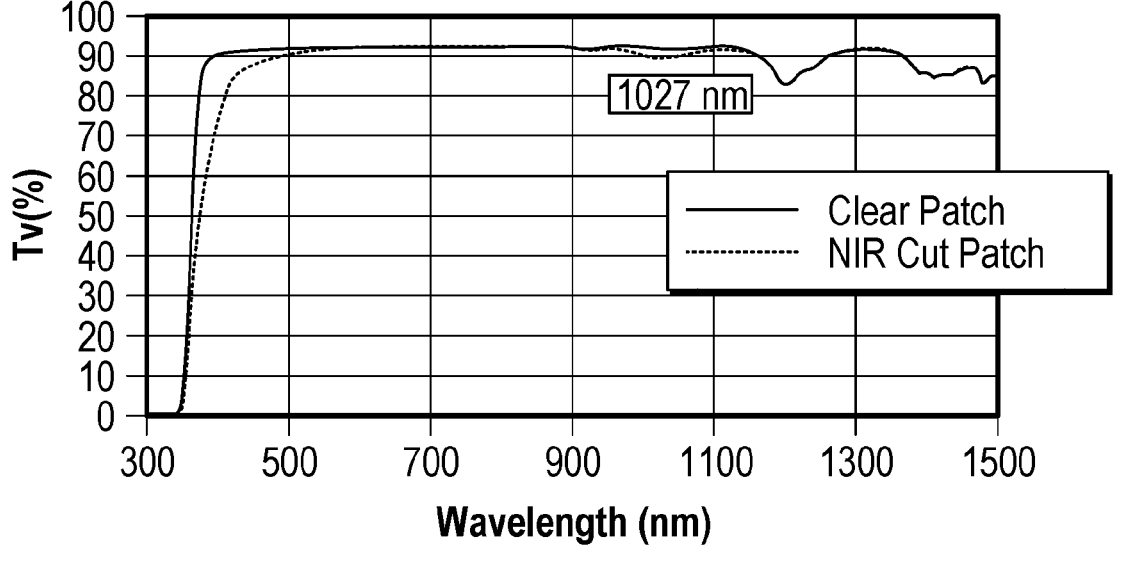
FIG. 4C shows a graph comparing a "NIR cut" removable optical patch as compared to a clear patch.

EXAMPLE 3—MR absorbing Epolight 4831 was mixed with TPU Texin Sun 3006 and injection molded into the removable optical patch 100 including Fresnel microstructures using the modified injection molding process described above. High replication quality of the Fresnel microstructures was achieved. FIG. 4C shows a graph comparing the "MR cut" removable optical patch 100 as compared to a clear patch. Notably, the spectrum shows a MR cut peak at approximately 1027 nm.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details, and combined in any permutation. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/ or described operations may be omitted in additional embodiments.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

Embodiments of the present disclosure may also be as set forth in the following parentheticals.

(1) An optical article, comprising: a first surface and a second surface, wherein at least one microstructure is patterned on the second surface to form a microstructure pattern, the microstructure pattern including a plurality of microlenses configured to adjust a focus of the optical article, and a first dye having a first dye peak absorbance wavelength with a first dye bandwidth, wherein the first dye is configured to filter a first predetermined range of light wavelengths.

(2) The optical article of (1), further comprising a protective microstructure pattern, the protective microstructure pattern having a plurality of protective microstructures arranged complementary to an arrangement of a plurality of optical microstructures, the arrangement of the plurality of optical microstructures being disposed in the complementary arrangement of the protective microstructures.

(3) The optical article of either (1) or (2), wherein the microstructured pattern is arranged in concentric rings around a center of the optical article.

(4) The optical article of any one of (1) to (3), wherein each microstructure is spherical in shape and a spacing between the arrangement of concentric rings of the microlenses is equal.

(5) The optical article of any one of (1) to (4), wherein each microstructure is aspherical in shape and a spacing between the arrangement of concentric rings of the microlenses is varied.

(6) The optical article of any one of (1) to (5), wherein a power variation of the plurality of microlenses is greater than −3.1D.

(7) The optical article of any one of (1) to (6), wherein the first surface and the second surface are included in an optical patch that is removably attached to the optical article along at least a portion of the first surface.

(8) The optical article of any one of (1) to (6), further comprising: wherein the first surface of the optical patch has a first flexible element, wherein the first surface of the first flexible element is convex, the second surface is concave, and the optical patch is removably attached to at least a portion of a concave surface of a lens.

(9) The optical article of any one of (1) to (8), wherein the first dye peak absorbance wavelength is configured to filter light in the first predetermined range of light wavelengths from 300 to 600, or 320 to 590, or 330 to 500, or 340 to 475, or preferably, 350 to 455 nm.

(10) The optical article of any one of (1) to (9), wherein the first dye peak absorbance wavelength is in a range of 780 nm to 2000 nm; and the first dye is configured to filter light in the first predetermined range of light wavelengths from 700 to 2500, or 720 to 2250, or 750 to 2100, or preferably, 780 to 2000 nm.

(11) The optical article of any one of (1) to (10), wherein the first dye peak absorbance wavelength is approximately 498 nm; the first dye bandwidth is less than 70 nm; and the first dye is configured to filter light in the first predetermined range of light wavelengths from 460 nm to 510 nm.

(12) The optical article of any one of (1) to (11), further comprising: a first flexible element, wherein the first flexible element includes a second dye configured to filter a second predetermined range of light wavelengths, the second dye including a second dye peak absorbance wavelength with a second dye bandwidth.

(13) The optical article of (12), wherein the second dye peak absorbance wavelength is approximately 550 to 600, or 560 to 590, or 583 to 587, or 595, or 585 nm; the second dye bandwidth is less than 90 nm, less than 70 nm, less than 50 nm, or less than 25 nm; and the second dye is configured to filter light in the second predetermined range of light wavelengths from 550 to 650, or 560 to 625, or 570 to 600 nm.

(14) The optical article of any one of (1) to (13), further comprising: a first flexible element, wherein a material of the first flexible element is thermoplastic polyurethane (TPU), polyvinyl chloride (PVC), polyether block amide (PEBA), thermoplastic elastomer, polydimethylsiloxane (PDMS), polycarbonate (PC), Polyamide (PA), poly(methyl methacrylate) (PMMA), cellulose triacetate (TAC), polyethylene terephthalate (PET), polyester, copolyester, or polyolefin.

(15) The optical article of (14), further comprising: a first flexible element, and a second flexible element including a second dye configured to filter a second predetermined range of light wavelengths, the second dye including a second dye peak absorbance wavelength with a second dye bandwidth, the second flexible element being optically coupled to the first flexible element.

(16) The optical article of (15), wherein the first flexible element includes a first surface and a second surface; the second flexible element includes a first surface and a second surface; the first surface of the second flexible element is optically coupled and removably attached to the second surface of the first flexible element; the first surface of the first flexible element is smooth.

(17) The optical article of any one of (12) to (16), wherein the microstructure pattern includes a plurality of Fresnel prisms or microlenses configured to adjust an optical power of a lens.

(18) The optical article of any one of (1) to (17), wherein the optical article is an ophthalmic lens.

(19) A method of fabricating a removeable optical patch for a lens, comprising: injection molding a first flexible element including a first dye configured to filter a first predetermined range of light wavelengths, the first dye including a first dye peak absorbance wavelength with a first dye bandwidth; and removably attaching the first flexible element to a concave surface of the lens along a first surface of the first flexible element, the first surface of the first flexible element being smooth and convex, the first flexible element being removably attached to the lens via electrostatic forces.

(20) The method of (19), wherein injection molding the first flexible element further comprises: injection molding a microstructure pattern on a second surface of the first flexible element, the microstructure pattern including a plurality of Fresnel prisms or microlenses configured to adjust an optical power of the lens.

(21) An optical patch for an optical article, comprising: a first flexible element, including a first layer including a first surface and a second surface, wherein at least one microstructure is patterned on the second surface, the microstructure pattern including a plurality of optical microlenses configured to adjust an optical power of the optical article, a first dye having a first dye peak absorbance wavelength with a first dye bandwidth, wherein the first dye is configured to filter a first predetermined range of light wavelengths, and a second layer disposed overtop the second surface, the second layer being optically transparent, and wherein the optical patch is removably attached to the optical article.

(22) An optical patch for an optical article, comprising: a first flexible element, including a first surface and a second surface, wherein at least one microstructure is patterned on the second surface, the microstructure pattern including a plurality of Fresnel prisms or microlenses arranged in concentric rings around a center of the first flexible element and configured to adjust an optical power of the optical article, and a first dye having a first dye peak absorbance wavelength with a first dye bandwidth, wherein the first dye is configured to filter a first predetermined range of light wavelengths, and wherein the optical patch is removably attached to the optical article.

What is claimed is:

1. A removable optical patch for an optical article, comprising:

a first surface and a second surface, wherein at least one microstructure is patterned on the second surface to form a microstructure pattern, the microstructure pattern including a plurality of microlenses configured to adjust a focus of the optical article, and a first dye, having a first dye peak absorbance wavelength with a first dye bandwidth, wherein the first dye is configured to filter a first predetermined range of light wavelengths, a protective layer comprising a protective microstructure pattern, the protective microstructure pattern having a plurality of protective microstructures arranged complementary to an arrangement of a plurality of optical microstructures of the microstructure pattern, the arrangement of the plurality of optical microstructures being disposed in the complementary arrangement of the protective microstructures, a second dye, in the protective layer, configured to filter a second predetermined range of light wavelengths, the second dye including a second dye peak absorbance wavelength with a second dye bandwidth, wherein the optical patch comprises two smooth sides along an exterior of the optical patch to which the optical patch is removably attached to the optical article with electrostatic forces, or with surface tension of a liquid.

2. The removable optical patch for an optical article according to claim 1, wherein the microstructure pattern is arranged in concentric rings around a center of the optical article.

3. The removable optical patch for an optical article according to claim 1, wherein each microstructure is spherical in shape and a spacing between the arrangement of concentric rings of the microlenses is equal; or each microstructure is aspherical in shape and a spacing between the arrangement of concentric rings of the microlenses is varied.

4. The removable optical patch for an optical article according to claim 1, wherein a power variation of the plurality of microlenses is greater than −3.1D.

5. The removable optical patch for an optical article according to claim 1, wherein the first surface is convex and the second surface is concave.

6. The removable optical patch for an optical article according to claim 1, wherein the first dye peak absorbance wavelength is configured to filter light in the first predetermined range of light wavelengths from 350 nm to 455 nm.

7. The removable optical patch for an optical article according to claim 1, wherein the first dye peak absorbance wavelength is in a range of 780 nm to 2000 nm; and the first dye is configured to filter light in the first predetermined range of light wavelengths from 780 nm to 2000 nm.

8. The removable optical patch for an optical article according to claim 1, wherein the first dye peak absorbance wavelength is approximately 498 nm;

the first dye bandwidth is less than 70 nm; and the first dye is configured to filter light in the first predetermined range of light wavelengths from 460 nm to 510 nm.

9. The removable optical patch for an optical article according to claim 1, wherein the second dye peak absorbance wavelength is approximately 585 nm;

the second dye bandwidth is less than 70 nm; and the second dye is configured to filter light in the second predetermined range of light wavelengths from 570 nm to 600 nm.

10. The removable optical patch for an optical article according to claim 1, wherein a material of the optical patch includes thermoplastic polyurethane (TPU), polyvinyl chloride (PVC), polyether block amide (PEBA), thermoplastic elastomer (TPE), polydimethylsiloxane (PDMS), polycarbonate (PC), Polyamide (PA), poly(methyl methacrylate) (PMMA), cellulose triacetate (TAC), polyethylene terephthalate (PET), polyester, copolyester, or polyolefin.

* * * * *